Sept. 28, 1965
L. B. BICHER, JR
3,208,899
LAMINATING FRAME
Filed Sept. 11, 1962
FIG. 1
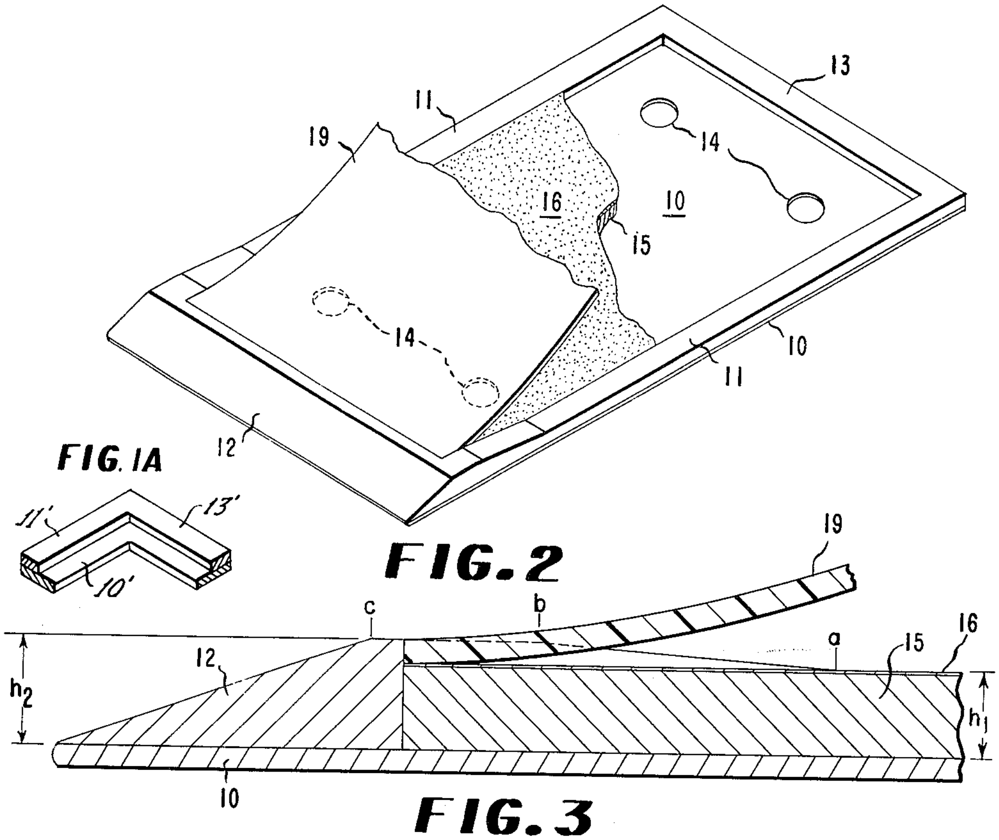
FIG. 1, FIG. 1A, FIG. 2
FIG. 3
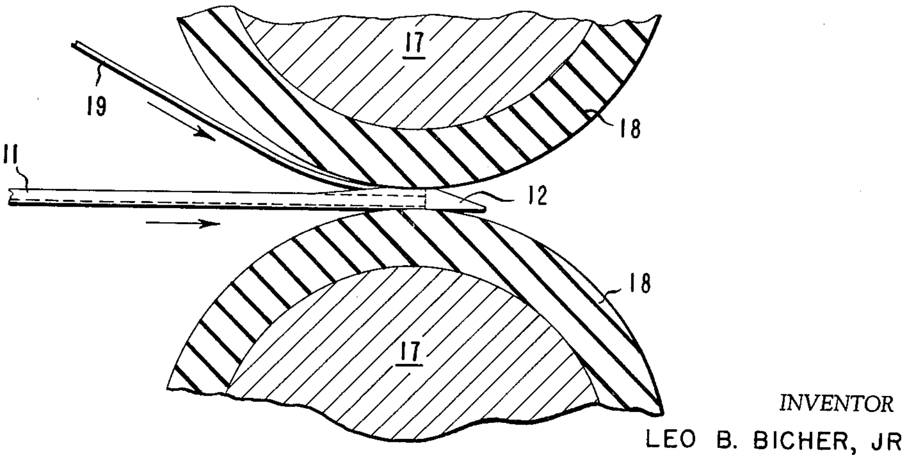
INVENTOR
LEO B. BICHER, JR
BY Lynn Barratt Morris
ATTORNEY United States Patent Office 3,208,899
Patented Sept. 28, 1965

3,208,899

LAMINATING FRAME

Leo B. Bicher, Jr., Hackensack, N.J., assignor to E. I. du Pont de Nemours and Company, Wilmington, Del., a corporation of Delaware Filed Sept. 11, 1962, Ser. No. 222,802
7 Claims. (Cl. 156—536)

This invention relates to a combining frame for holding sheets or plates during lamination. It also relates to processes for combining sheets or plates especially to form flexible and rigid photopolymerizable printing plates.

Photopolymerizable printing plates are conveniently manufactured by laminating a preformed, photopolymerizable sheet on an adhesive coated support, e.g., a rigid or flexible sheet of steel, aluminum or other material.

Suitable adhesive compositions for laminating such photopolymerizable sheets to supports are disclosed in Burg U.S. Patent 3,036,913, May 29, 1962. Wherever the lamination is carried out in a press with flat heated platens, as disclosed in the said Burg patent, printing plates of excellent quality are obtained. The laminating pressure is essentially uniform over the entire plate area and the laminating force acts in a direction normal to the surface of the plate. Such plates can therefore be made without waste as the entire plate surface is usable and no edge trimming is required. This method of press-laminating, however, is relatively slow and requires expensive equipment. It is adequate for small production runs or experimental purposes. Large plates, i.e., larger than about 18 by 24 inches cannot be made in a flat press with the desired narrow thickness tolerances.

When photopolymerizable plates are made by combining in a calender an adhesive coated support and a sheet photopolymerizable material, edges defects such as bubbles, misalignments and ridges occur. Misalignments lead to edge defects of the finished product. It is, therefore, necessary to fabricate the printing plate larger than required and to trim it to the desired size after the combining step, thus allowing for misalignments and edge defects. This procedure is obviously wasteful, expensive and time consuming.

It is an object of this invention to provide a frame for laminating sheets or plates by means of forming rolls that is simple in construction and dependable in use. Another object of the invention is to provide such a frame which is sturdy and gives uniform results over long periods of time. A further object is to provide such a frame which does not require adjustment during use. A related object is to provide a simple and practical process for press-laminating sheets and plates. A further object is to provide such a process that is relatively rapid and utilizes forming rolls. Still further objects will be apparent from the following description of the invention.

The novel laminating frame of this invention comprises (1) a shallow tray having side rails and front and back rails extending between said side rails and (2) a shallow recessed area between said rails being adapted to receive a base sheet and a sheet to be laminated thereto, the side rails being of uniform height for the major portion of their length, then increasing gradually in height, the side rails of the frame then being uniform in height and then not more than a short distance after reaching maximum height, e.g., 0 to about 1 inch gradually being reduced in height toward the front edge of the front rail. The base rail has the same height as the adjacent portions of the side rails. The frame can have a bottom plate extending under and between the rails. The bottom plate can have thin lateral portions and a large central area being cut away or extending between the rails and provided with small openings. In general, the main depth of the recess will be approximately the thickness of the base sheet or plate, and the inner dimensions of the recess are approximately those of the outer dimensions of the sheet or plate to be fabricated by lamination.

The novel process of the invention comprises inserting a base sheet in a frame as described above, placing the downwardly tapered front edge near the nip of opposing pressure rolls, placing the front edge of a sheet to be laminated to the lower sheet adjacent the inner surface of the front rail and forcing the assembly between the pressure rolls. The laminated plate is then removed from the frame.

The invention will now be further described with reference to the attached drawing which constitutes a part of this application. In this drawing FIG. 1 is an isometric view of the combining frame with parts in broken section and showing the base sheet and upper sheet to be press-laminated.

FIG. 1–A is an isometric view with parts in section of a corner of an alternative construction of the frame.

FIG. 2 is an enlarged section of the tapered side rail and front rail construction, and FIG. 3 is an elevation of the front portion of the frame and sheets to be laminated as they pass between the resilient surfaces of the opposing pressure rolls.

With reference to the drawing, and especially to FIG. 1, the laminating frame comprises a bottom plate 10 having integral with or fastened to its upper surface near its peripheral edges, side rails 11, front rail 12 and back rail 13. The back rail and the side rails are of uniform height at their juncture and the side rails are of uniform height ($h_1$) throughout the major part of their length. The height ($h_1$) is approximately the thickness of the base plate or sheet 15. As they approach the front rail, the side rails gradually increase to height ($h_2$) which is approximately the same as the total thickness of the base sheet 15, any adhesive layer 16 (if present and which is usually quite thin), and upper sheet 19 to be laminated. The adjacent upper surface of the front rail may continue for a short distance at the same height ($h_2$) as the adjoining surface of the side rails (e.g., between points *b* and *c*), and then gradually decrease in height toward its front edge. It may slant downwardly in a straight or curved line to a height a fraction of the height of the back rail, and preferably essentially to the bottom plate.

As shown in FIG. 1, the bottom plate is provided with holes 14 so that after the laminating operation the bottom sheet can be pressed upwardly to remove the laminated plate or sheet from the frame.

In FIG. 1–A the bottom ledge is 10', and parts 11' and 13' correspond to parts 10 and 11 of FIG. 1.

In operation, the base sheet or plate 15, having an adhesive coating 16 on its upper surface, is placed in the shallow recess between the side rails and front and back rails. The assembly is placed near the nip between pressure rolls 17 having resilient outer surfaces 18. The sheet 19 (e.g., a photoploymerizable sheet) to be pressed onto or laminated with the support, is then placed above the adhesive surface of the support and with its leading end against the inner wall of the front rail. The assembly is then forced between the pressure rolls. After the frame and laminae contained therein pass beyond the pressure rolls, the laminated sheet or plate is removed and the cycle is repeated to make successive laminated plates.

The leading edge of this frame is wedge-shaped as shown in detail in FIG. 2. The length of the wedge is not critical, and for laminating plates about 18 inches by 24 inches, about 1 to 2 inches are adequate. The frame height $h_2$ from $b$ to $c$ is uniform and approximately equal to the thickness of the finished laminate. From $b$ to $a$, the frame height gradually decreases and from "$a$" on to the trailing edge it is uniform approximately equal to the thickness, $h_1$, of the base plate or sheet to be laminated in the frame. The distance $b$ to $c$ is about ½ inch or more, and the distance $a$ to $b$ about 1 to 3 inches, but not more than about one tenth of the total frame length.

The inside dimensions of the combining frame are governed by the size of the laminate to be made. A commonly used size of printing plate is 18 inches by 24 inches. Typically, such a plate will have a total thickness of 0.152 inch, of which an aluminum base plate or support can be 0.103 inch thick, the adhesive layer 0.0025 to 0.003 inch thick and the photopolymerizable sheet 0.046 inch thick. The wedge-shaped leading edge of a combining frame for this plate size can be about 1 inch long. The portion $b$–$c$ of uniform thickness can be about 1 inch, the tapered portion $b$–$a$ about 2 inches. The side and rear members of the frame can be about 1 inch wide. The outside dimensions of a frame designed to accommodate an 18 by 24 inch plate can, therefore, be about 2 by 27 inches. The height $h_2$ of the portion $b$–$c$ of the frame can be about 0.152 inch, i.e., equal to the thickness of the finished printing plate. The height $h_1$, of the side and rear members can be about 0.103 inch, i.e., equal to the thickness of the aluminum support. The bottom plate 10 can conveniently be about 1/16 inch thick, but can be thicker or thinner or this dimension is not critical. Distance $b$–$c$ can be 0 to 1 inch.

Although the frame height is preferably equal to the thickness of the support and the finished plate, respectively, as indicated above, a slightly higher or lower frame can be used without seriously affecting the quality of the product. Thus, a tolerance of $\pm 0.010$ inch is practical.

Although the preferred embodiment, as described above, comprises a combining frame and a bottom plate, the latter can be in the form of a narrow lateral projection or ledge of thin metal extending about ¼ inch inward the inside of the frame. The plate is then supported only by the very edges. By making this ledge thin, e.g., 1/16 inch or less, no plate deformation will take place during the combining step. In a further modification, the frame alone, i.e., without bottom plate or ledge, can be used. However, such structures are not preferred for plate sizes larger than about 18 by 24 inches because they can easily become warped or deformed in handling.

As shown in the drawings, the leading edge of the combining frame is generally wedge shaped or beveled. In the preferred type of combining calender, the lower roll is stationary, whereas the upper roll is pushed up by the article fed in the nip of the rolls.

The frame and bottom plate are preferably made of metal, e.g., aluminum, magnesium, stainless steel, brass, etc. However, other materials can be used, such as plastics or wood. The frame can be bolted, riveted or nailed to the bottom plate, but other methods of fastening, such as welding or soldering, are equally adequate.

In one embodiment, the back member and at least one side member of the frame can be made adjustable laterally or exchangeable so that one combining frame can accommodate various plate sizes of approximately the same thickness.

In use, an adhesive coated support plate is placed in a combining frame of suitable size, the adhesive coated surface facing up. The so loaded frame is placed on a table or shelf in proper alignment with the nip of the combining rolls. The flexible sheet is placed on an inclined table or shelf properly aligned with the first table. The flexible sheet is then pushed forward so that its leading edge butts squarely against the inner front member of the combining frame.

In practicing the invention, practically any photopolymerizable sheet can be laminated to any adhesive coated base plate or sheet. Suitable photopolymerizable compositions, sheets and base plates or supports are disclosed in Plambeck U.S. Patents Nos. 2,760,863 and 2,791,504, Martin U.S. Patents Nos. 2,927,022, 2,927,023 and 2,902,365, Barney U.S. Patent No. 2,948,611, Saner and Burg U.S. Patent No. 2,972,540, Munger U.S. Patent No. 2,923,673, Smith U.S. Patent No. 3,012,952, and other patents.

It is possible to use a plurality of small plates in a large frame for a simultaneous lamination. For example, a frame having inside dimensions of 22 by 28 inches can accommodate four plates measuring 11 by 14 inches. They are laminated to a sheet 22 by 28 inches. After lamination, the large sheet can be cut to give four smaller plates. Obviously, any size plate made in the frame of this invention can be cut to a desired smaller size after lamination.

The frame of this invention is primarily designed for the manufacture of photopolymerizable printing plates in which a relative thin, flexible, sheet of a photopolymerizable composition is combined with a relatively thick metal support. It can, however, be used for other applications that require accurate alignment of two flat laminants, at least one of which is flexible. Most commonly, the articles made are of rectangular or square shape, but other shapes are within the scope of this invention.

The frame can be used to laminate upper sheet material which has a bottom adhesive layer to a plate with no adhesive layer. Sheets which require no adhesive layer can be laminated in the frame.

The invention has the advantage that two, three or four or more small plates can be simultaneously laminated in the frame. In such case, the bottom 10 preferably is complete. However, if the frame has narrow lateral shoulders, a thin sheet can be added to support the small plates. It can be removed when the frame is used for large plates.

This invention represents an advantage over prior art frames and procedures by providing a frame that allows easy and rapid alignment of two laminants. It improves the quailty of the laminate, reduces the amount of rejects and, therefore, presents an economic advantage. The device is easily built, requires no maintenance and is not subject to wear.

I claim:

1. A laminating frame for laminating sheets of material to each other by means of forming rolls comprising a shallow tray having side rails, front and back rails extending between the side rails, an open top and a bottom, a shallow recessed area between said rails that is adapted to receive a sheet support and a sheet to be laminated thereto, the side rails (1) being identical in height with each other at corresponding points throughout their entire length;

(2) being the same in height as the back rail for a major portion of their length, then gradually increasing in height to a maximum height and not more than a short distance after reaching the maximum height gradually decreasing in height to the front edge of the front rail;

the front rail being identical in height throughout its entire length with the coextensive portions of the side rails, the coextensive portions and front rail forming a wedge-shaped leading surface, the bottom having at least one opening so that any laminating sheets can be subjected to forces through the opening to remove them from the frame.

2. A laminating frame according to claim 1 wherein the height of the back rail is approximately the same as the thickness of the support and the height of the side rail and the front rail at the maximum height is approximately the same as the total thickness of the support and any sheets and layers to be laminated thereto.

3. A laminating frame according to claim 1 wherein the rails are made of metal.

4. A laminating frame according to claim 1 having a bottom plate extending under and between the rails.

5. A laminating frame according to claim 1 having a bottom plate extending under and between the rails, said bottom plate having small spaced openings extending therethrough.

6. A laminating frame according to claim 1 wherein the frame has a bottom consisting of thin narrow projections extending laterally from the side rails.

7. A laminating frame according to claim 1 wherein the maximum height continues for a distance of about ½ inch to about 1 inch.

References Cited by the Examiner

UNITED STATES PATENTS

| | | | |
|---|---|---|---|
| 2,149,636 | 3/39 | Slaughter | 96—67 |
| 2,362,434 | 11/44 | Fitch et al. | 40—158 |
| 2,458,349 | 1/49 | Cross | 40—158 XR |
| 2,487,982 | 11/49 | Reyniers | 40—152 XR |
| 2,811,799 | 11/57 | Clark | 40—152 |
| 3,029,178 | 4/62 | Carver | 156—539 XR |
| 3,047,052 | 7/62 | Fridrich | 156—580 |
| 3,069,795 | 12/62 | Lieberman | 40—152 |

EARL M. BERGERT, *Primary Examiner.*

JACOB STEINBERG, *Examiner.*